United States Patent
Jakobsen

(10) Patent No.: US 10,345,193 B2
(45) Date of Patent: Jul. 9, 2019

(54) BEARING GAUGE ARRANGEMENT

(71) Applicant: Siemens Aktiengesellschaft, München (DK)

(72) Inventor: Jeppe Jakobsen, Brande (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 385 days.

(21) Appl. No.: 15/371,419

(22) Filed: Dec. 7, 2016

(65) Prior Publication Data

US 2017/0241865 A1    Aug. 24, 2017

(30) Foreign Application Priority Data

Feb. 18, 2016  (EP) .................................. 16156317

(51) Int. Cl.
| | |
|---|---|
| *G01B 7/14* | (2006.01) |
| *F16C 19/36* | (2006.01) |
| *G01M 13/04* | (2019.01) |

(52) U.S. Cl.
CPC .......... *G01M 13/04* (2013.01); *F16C 19/364* (2013.01); *G01B 7/144* (2013.01); *F16C 2233/00* (2013.01); *F16C 2360/31* (2013.01)

(58) Field of Classification Search
CPC .............. F16C 19/364; F16C 2233/00; F16C 2360/31; G01B 7/144; G01M 13/04
USPC .......................................................... 33/517
See application file for complete search history.

(56) References Cited

U.S. PATENT DOCUMENTS

| | | | |
|---|---|---|---|
| 4,196,629 A | 4/1980 | Philips | |
| 4,625,567 A | 12/1986 | Frayer, Jr. et al. | |
| 4,890,233 A * | 12/1989 | Ando | G01C 21/08 701/530 |
| 5,226,736 A | 7/1993 | Becker et al. | |
| 5,585,577 A * | 12/1996 | Lemoine | B21B 31/07 374/153 |
| 6,802,208 B2 * | 10/2004 | Chinitz | G01L 5/0019 73/115.07 |

(Continued)

FOREIGN PATENT DOCUMENTS

| | | |
|---|---|---|
| CN | 102620631 A | 8/2012 |
| CN | 104295454 A | 1/2015 |

(Continued)

OTHER PUBLICATIONS

Extended European Search for EP Application No. 16156317.6, dated Sep. 27, 2016.

(Continued)

*Primary Examiner* — Yaritza Guadalupe-McCall
(74) *Attorney, Agent, or Firm* — Schmeiser, Olsen & Watts, LLP

(57) ABSTRACT

A bearing gauge arrangement including a holding frame dimensioned to replace a load-carrying element between an inner race and an outer race of a bearing, at least one distance gauge arranged in the holding frame to measure a distance between the inner race and the outer race during operation of the bearing, and an evaluation unit configured to evaluate measurements from a distance gauge relative to a bearing reference dimension. A generator including a main bearing between rotor and stator, and a bearing gauge arrangement, and a method of detecting a deformation of a bearing is also provided.

15 Claims, 7 Drawing Sheets

(56) References Cited

U.S. PATENT DOCUMENTS

| | | | | |
|---|---|---|---|---|
| 8,869,633 B2* | 10/2014 | Biehl | ............... | F16C 19/52 |
| | | | | 73/862.473 |
| 2003/0000307 A1* | 1/2003 | Lohberg | ............... | G01D 5/145 |
| | | | | 73/514.16 |
| 2003/0164050 A1* | 9/2003 | Chinitz | ............... | G01L 5/0019 |
| | | | | 73/862.49 |
| 2004/0261543 A1* | 12/2004 | Van Leeuwen | ....... | F16C 19/522 |
| | | | | 73/862.49 |
| 2015/0023621 A1* | 1/2015 | Eriksen | ............... | F16C 37/00 |
| | | | | 384/320 |
| 2015/0168257 A1* | 6/2015 | Erskine | ............... | F16C 41/004 |
| | | | | 384/448 |
| 2015/0338310 A1* | 11/2015 | Van Der Ham | ...... | G01M 13/04 |
| | | | | 702/35 |
| 2016/0169288 A1* | 6/2016 | Leimann | ............... | F16C 41/007 |
| | | | | 384/448 |
| 2017/0241865 A1* | 8/2017 | Jakobsen | ............... | F16C 19/364 |
| 2018/0038413 A1* | 2/2018 | Aizawa | ............... | F16C 19/525 |
| 2018/0038772 A1* | 2/2018 | Yanagisawa | ............... | G01M 13/04 |

FOREIGN PATENT DOCUMENTS

| | | |
|---|---|---|
| CN | 104314751 A | 1/2015 |
| CN | 105157645 A | 12/2015 |
| SU | 1538029 A1 | 1/1990 |

OTHER PUBLICATIONS

Non-English Chinese Office Action for application No. 201710086853.5 dated Dec. 5, 2018.

* cited by examiner

BEARING GAUGE ARRANGEMENT

CROSS-REFERENCE TO RELATED APPLICATIONS

This application claims priority to European application No. EP 16156317.6 having a filing date of Feb. 18, 2016, the entire contents of which are hereby incorporated by reference.

FIELD OF TECHNOLOGY

The following describes a bearing gauge arrangement, a generator, and a method of detecting a bearing deformation.

BACKGROUND

A large bearing for use in a large machine should last for many years, since it is an expensive part and is also difficult to access, often requiring the machine to be disassembled in order to be replaced. The main bearing of a wind turbine generator for example may be expected to have a useful lifetime of 20-25 years. For such large bearings, it is therefore very important to know how the geometry of the bearing might change during its lifetime. The main bearing of a large machine such as a wind turbine generator is often realised as a roller bearing, with essentially cylindrical rollers that transfer load from rotor to stator (or vice versa, depending on generator type) while allowing the rotor to rotate smoothly about the stator. To operate efficiently, it is important to ensure that the rollers are supported evenly along their lengths. The roller races (or "raceways") must also be as even as possible so that the load is evenly distributed over the rollers.

A bearing specification for a large machine such as a wind turbine generator must ensure that these conditions are fulfilled over the expected bearing lifetime, and prescribes the use of material such as hardened or tempered steel and highly precise machining steps. Such a bearing can therefore be very expensive. However, even when manufactured to a very demanding specification, external influences that act on the bearing once it is operational may reduce its load-carrying capacity. For example, bolts may be used to fasten a bearing ring to another structure, and the act of tightening these bolts may distort the bearing slightly. Such a slight deformation of the bearing cannot be visually identified, and the bearing will continue to function. However, even only a slight deformation can change the support length of the rolling elements, and the reduced load-bearing capacity can significantly shorten the bearing lifetime.

SUMMARY

An aspect relates to providing a method of assessing the condition of a bearing during operation.

According to embodiments of the invention, the bearing gauge arrangement comprises a holding frame arranged between an inner race and an outer race of a bearing to replace a rolling element of the bearing; at least one distance gauge arranged in the holding frame to measure a distance between the inner race and the outer race during operation of the bearing; and an evaluation unit realized to evaluate distance measurement values from a distance gauge relative to a bearing reference dimension in order to detect a bearing deformation.

In the context of embodiments of the invention, the expression "during operation of the bearing" is to be understood to mean "during operation of the machine that incorporates the bearing", since the purpose of the bearing is to reduce friction between a moving part (e.g. the rotor) and a stationary part (e.g. the stator) of a machine such as a generator. An advantage of the bearing gauge arrangement according to embodiments of the invention is that by monitoring the distance between the opposing races from within the bearing, any relative deformation between the inner and outer bearing rings can be identified. Embodiments of the invention make this possible by arranging the distance gauge(s) in the cavity between the races, so that any departure from a reference or specification distance can be directly identified during operation of the bearing, allowing the identification of any change in bearing shape. The bearing gauge arrangement according to embodiments of the invention can identify any relative change between the inner and outer rings of the bearing.

According to embodiments of the invention, the generator assembly comprises a main bearing between a rotor and a stator, and a bearing gauge arrangement according to embodiments of the invention, wherein the holding frame of the bearing gauge arrangement replaces a rolling element of the main bearing.

An advantage of the inventive generator assembly is that the condition of its main bearing can be reliably evaluated during operation, and any slight distortion of the bearing can be identified from within the bearing. This allows pre-emptive corrective measures to be taken so that the lifetime of the bearing can be ensured or even extended.

According to embodiments of the invention, the method of detecting a deformation of a bearing during operation comprises the steps of arranging a number of distance gauges in a holding frame, which holding frame is dimensioned according to a rolling element of the bearing; substituting a rolling element of the bearing by the holding frame; applying the distance gauges to measure distance between the inner race and the outer race of the bearing during operation of the bearing; and evaluating the measurements relative to a reference bearing dimension.

The inventive method advantageously allows the relevant—i.e. critical—dimensions of the bearing to be thoroughly monitored during operation of the bearing prior to installation and/or after installation. Any deviation from an expected or reference dimension—e.g. a specified distance between inner and outer races—can easily be identified. This allows a bearing deformation which would otherwise go undetected, for example a very slight deformation, to be identified in good time and can allow corrective measures to be taken. The inventive method can therefore advantageously be applied pre-emptively to avoid wear of the rollers that would otherwise arise from an uneven load distribution.

In the following, it may be assumed that the generator is a large generator of the type used in a wind turbine. In a large wind turbine such as a direct-drive type, the hub and outer rotor are connected to the inner stator by means of a large roller bearing. In the following, without restricting embodiments of the invention in any way, it may be assumed that the bearing is a component of a generator installed in a wind turbine. In such a large machine, the main bearing may preferably comprise a conical or tapered roller bearing, since this type of bearing is very well suited to the heavy load it must carry. A roller bearing can have a single "row" of rollers, arranged in an annular configuration. In a double-row roller bearing, two such annular arrangements of rollers (which may be cylindrical or tapered) are placed in a back-to-back configuration.

Any suitable kind of distance gauge may be used in the inventive bearing gauge arrangement. Preferably, a distance gauge is arranged to measure the perpendicular distance between the opposing race surfaces of the bearing. In one embodiment, a distance transducer can be implemented, for example a differential variable reluctance transducer (DVRT). A distance gauge could also be realized as a linear potentiometer. The distance gauge is preferably chosen to have a degree of accuracy depending on the dimensions and field of use of the bearing in which the distance gauge arrangement is to be used. For example, distance gauges with an accuracy of 2 micrometres may be preferred to monitor the quality of a conical bearing between the rotor and stator of a wind turbine generator.

One or more contactless distance gauges can equally be implemented, for example eddy-current transducers, laser distance gauges, etc. A contactless distance gauge essentially does not have any parts that could wear out, but can still deliver measurements to the necessary degree of precision.

A distance gauge can be connected to the evaluation unit over a data interface so that the evaluation unit can receive measurement values from the distance gauge. This can be realized using a cable connection. For example, if an evaluation procedure is only to be performed before and after installation of the machine and bearing, for example, the evaluation unit can be physically connected to the distance gauges(s) using appropriate cables. After evaluating the bearing status, and after performing any corrective measures, the evaluation unit can be disconnected and removed. Alternatively, the evaluation unit may remain in place as a permanent part of the arrangement, so that bearing evaluation procedures can be performed at any time.

Of course, the bearing gauge arrangement can comprise any number of wireless distance gauges. In such an embodiment, the distance gauges can transmit their measurement values over a suitable interface such as a wireless LAN to a corresponding receiver of the evaluation unit. Such a realization may be advantageous when the bearing gauge is implemented in a bearing on a remote site. For example, the bearing gauge arrangement may be used to perform real-time evaluations for the main bearing of an operational wind turbine, in order to observe the effects of wind loading on the bearing during changing wind conditions, i.e. in a "live" manner. The evaluation unit may be realised as part of a wind turbine controller network, so that the evaluation of the measurement values can be accessed by a remote operator, for example an offshore wind park operator.

The holding frame is to be understood as any suitable construction that is realised to hold or support one or more distance gauges in a defined orientation and/or position relative to one or both bearing races. In a preferred embodiment of the invention, the position of a distance gauge is fixed relative to the holding frame, which effectively acts as a frame of reference. The position of the holding frame is also preferably fixed relative to a bearing race. In this way, any measurement value obtained by a distance gauge can be related to a fixed reference, for example the stationary bearing ring, or the bearing ring that is not bolted.

In a preferred embodiment of the invention, a distance gauge arrangement can be spring-loaded against a race surface. For example, the distance gauge can comprise a transducer with its effective direction essentially perpendicular to the surface of the outer race, and a steel roller ball in contact with the outer race, held in a spring-loaded element which is free to move along an axis parallel to the effective direction of the distance transducer. Any deformation in the outer bearing ring relative to the inner ring will be transferred to the transducer.

In a large bearing such as a ball bearing or a roller bearing, the bearing elements may be contained in a cage. The cage can comprise a framework with a compartment for each bearing element. This design is in contrast with other bearing designs in which the bearing elements are free to move about relative to both rings. In a further preferred embodiment of the invention, therefore, the holding frame is preferably also held in a cage compartment. The holding frame may be constructed to fit into a compartment of a bearing cage secured to one of the bearing rings, or it may act as a cage to hold the distance gauge arrangement at a fixed orientation relative to the bearing races.

As indicated above, the holding frame is contained in the bearing such that it effectively substitutes or replaces a bearing element. This means that there will be a bearing element on either side of the holding frame. The purpose of the holding frame is essentially to hold the distance gauge(s) in a fixed and predetermined position relative to one or both of the bearing races. Preferably, the bearing gauge arrangement comprises two distance gauges. These are preferably arranged to measure the race surface separation over as wide a distance as possible, i.e. across the width of the bearing. To this end, the two distance gauges are preferably arranged one essentially at each outer edge of the bearing, i.e. near the outer perimeter of a race. Such an arrangement can favourably increase the accuracy of the measurement values, allowing even very small angular deformations to be detected in good time.

Preferably, the distance gauge arrangement is used in an initial calibration run for the bearing to obtain a record of the initial inner bearing space. This can be performed before initial installation of the bearing in the machine in which it will be used, i.e. before the bearing has been exposed to any significant loading. After installation in the machine, an evaluation run can again be carried out. The results can be analysed relative to the calibration results to identify any anomalies and to identify any corrective measures that may need to be taken.

An annular bearing generally acts as an interface between a rotating component and a stationary component, for example in the case of a generator. Each bearing ring may be bolted or otherwise secured to its associated component. This may result in minor but far-reaching deformations in the bearing. Therefore, in a preferred embodiment of the invention, the method comprises the steps of evaluating measurements from the number of distance gauges during operation of the bearing prior to a final installation procedure; performing the final installation procedure; and subsequently evaluating measurements from the distance gauge during operation of the after the final installation procedure. In such an embodiment, the "final installation procedure" may involve a procedure of finally tightening any bolts to secure a bearing ring to a generator component during a wind turbine installation, for example. Equally, the expression may apply to a step of tightening bolts during a maintenance procedure.

As indicated above, the evaluation unit is preferably realised to receive measurement values from the distance gauges and to analyse the information in order to identify any deformation of the bearing, for example a deformation of a bearing ring after fastening it to a bedframe by a plurality of bolts. Preferably, the evaluation unit is realized to relate the distance gauge measurements to corresponding regions along the bearing circumference. For example, a comparison of measurement values received from one distance gauge over one complete rotation of the bearing can be compared to a reference or expected value. Any departure from this expected value will indicate a deformation in the bearing. The evaluation unit may be supplied with information regarding the beginning and end of a complete rotation, for example by using a Hall-effect sensor. The rotational velocity of the bearing can usually be assumed to be constant, particularly in the case of a main bearing of a large direct-drive wind turbine. With this information, it is relatively straight-forward to interpret the measurement values received from a distance gauge to determine the location of a deformation. Preferably, the information provided by a pair of distance gauges arranged over the width of the bearing race is interpreted to identify the extent of an angular deformation of the bearing. Such a deformation might arise on account of tightening bolts between a bearing ring and a carrying structure, and/or on account of external loading on the bearing.

In a particularly preferred embodiment of the invention, the measurement data provided by the distance gauges is augmented by data relating to an external bearing load. An example of such an external load might be wind load forces acting on the main bearing of a wind turbine. In such a realisation, an evaluation unit is preferably realized to identify a relationship between the external load and a bearing deformation identified on the basis of the distance gauge measurement values.

The evaluation can be preformed essentially continually, or at regular intervals chosen according to the machine in which the bearing is installed. For example, if the bearing is installed in a direct-drive wind turbine whose outer rotor has a relatively slow rotational velocity, it may be sufficient to run an evaluation sequence once per hour. Preferably, the evaluation sequence is performed over a period of time following a maintenance or installation step, in which fastening bolts are tightened or otherwise adjusted. In such a situation, the results of an evaluation can be used to determine to what extent the tension of one or more bolts could be adjusted in order to correct an unsatisfactory measurement.

BRIEF DESCRIPTION

Some of the embodiments will be described in detail, with reference to the following figures, wherein like designations denote like members, wherein FIG. 1 shows a partial cross-section through a roller bearing with an embodiment of the bearing gauge arrangement;

In the diagrams, like numbers refer to like objects throughout. Objects in the diagrams are not necessarily drawn to scale.

DETAILED DESCRIPTION

Figure 1:
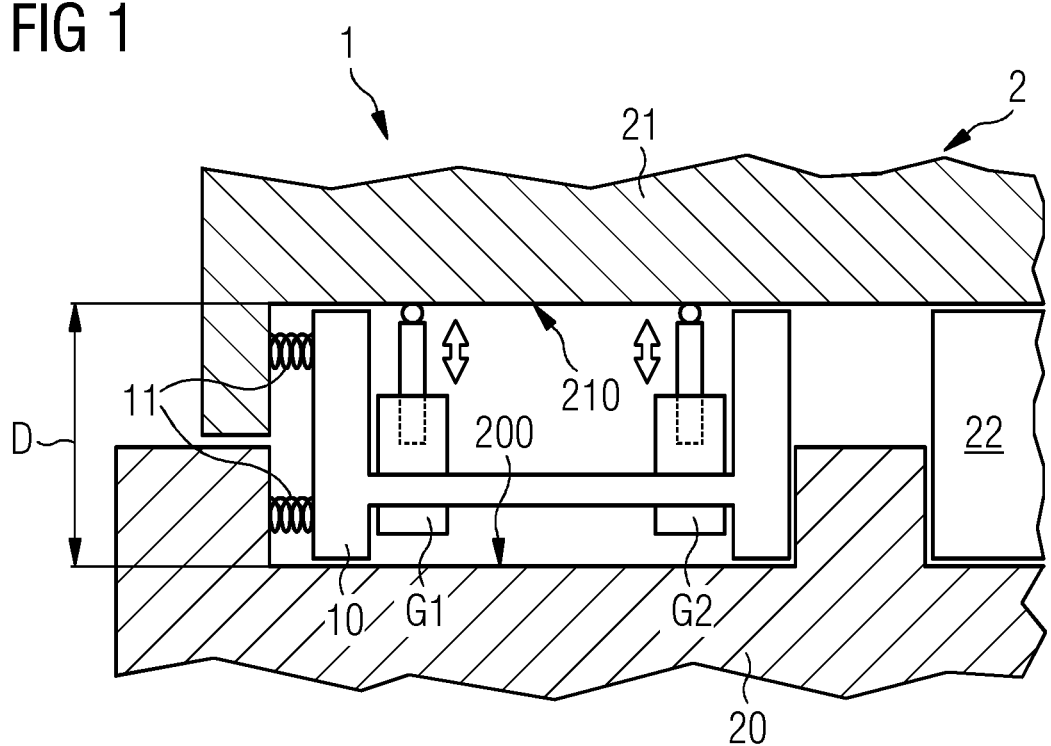

FIG. 1 shows a partial cross-section through a double-row roller bearing 2 taken along a plane through the axis of rotation of the bearing 2 (which is mounted vertically in a machine), and showing a bearing gauge arrangement 1 according to an embodiment of the invention, taking the place of a roller in one of the races. A roller 22 in the other race is shown to the right of the diagram. The roller bearing 2 can be of the type described in FIG. 2 which is another partial cross-section through the bearing 2 (taken along a plane orthogonal to the plane of FIG. 1 and to the axis of rotation of the bearing 2) showing an inner ring 20 and an outer ring 21 of the bearing 2, and a number of rollers 22. The bearing 2 is constructed such that the inner race and outer race are separated by a distance D. Highly precise machining, milling and polishing steps and the use of high-quality materials are required to achieve a constant distance D over the entire circumference of the bearing. This distance D should also remain constant in order to ensure that loads are evenly distributed over the rollers 22 and so that the rollers 22 are not unduly subject to wear. For the sake of simplicity, these diagrams show cylindrical rollers, but it should be noted that the bearing could equally well be realised as a tapered roller bearing, for which each raceway is a segment of a cone, and in which the rollers have a slightly tapered conical form.

In FIG. 1, one of the rollers 22 has been replaced by an embodiment of the inventive bearing gauge arrangement 1. The bearing gauge arrangement 1 comprises a holding frame 10, to which two distance gauges G1, G2 have been mounted. In this exemplary embodiment, the holding frame 10 has essentially the same maximum dimensions as the roller that it replaces. The rollers 22 are contained in a cage (not shown in the diagram), so that the outer ends of each roller 22 are at a distance from the vertical raceway faces. To ensure that the holding frame 10 maintains a steady orientation relative to the races, it is spring-loaded using springs 11 to press it against an appropriate surface of the bearing at all times. In this exemplary embodiment, a distance gauge G1, G2 is a distance transducer, for example a DVRT type distance gauge or an eddy-current transducer. Each distance gauge G1, G2 is arranged to make contact with a raceway at all times during rotation of the bearing, in this case with the outer raceway 210. This can be achieved in any suitable manner as will be known to the skilled person. Each transducer G1, G2 is arranged so that its effective direction is essentially perpendicular to the outer raceway 210. Any departure from the specified distance D will then translate into a corresponding movement of the transducer G1, G2 along its effective direction. This movement is converted by the transducer G1, G2 into an appropriate signal. A prior calibration of the bearing gauge arrangement 1 in this bearing 2 allows the signal to be interpreted as a distance measurement value. When the bearing 2 is used in a wind turbine to support the generator, one of the distance gauges G1, G2 will be towards the front of the generator and may be referred to as the "upwind distance gauge", while the other distance gauge may be referred to as the "downwind distance gauge".

Figure 2:
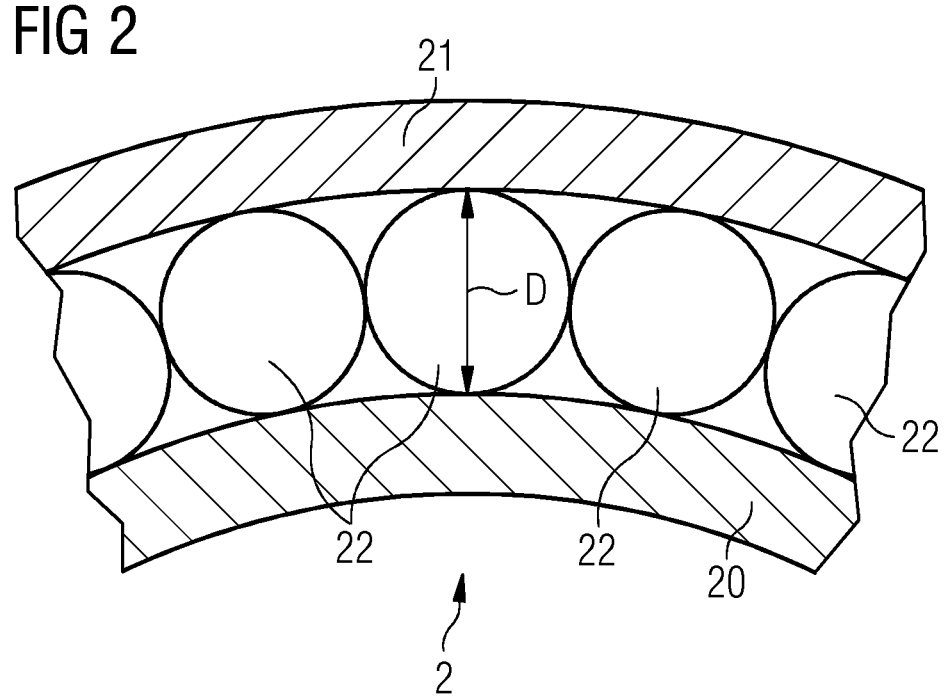
FIG. 2 shows a further partial cross-section through the bearing of FIG. 1.
Figure 3:
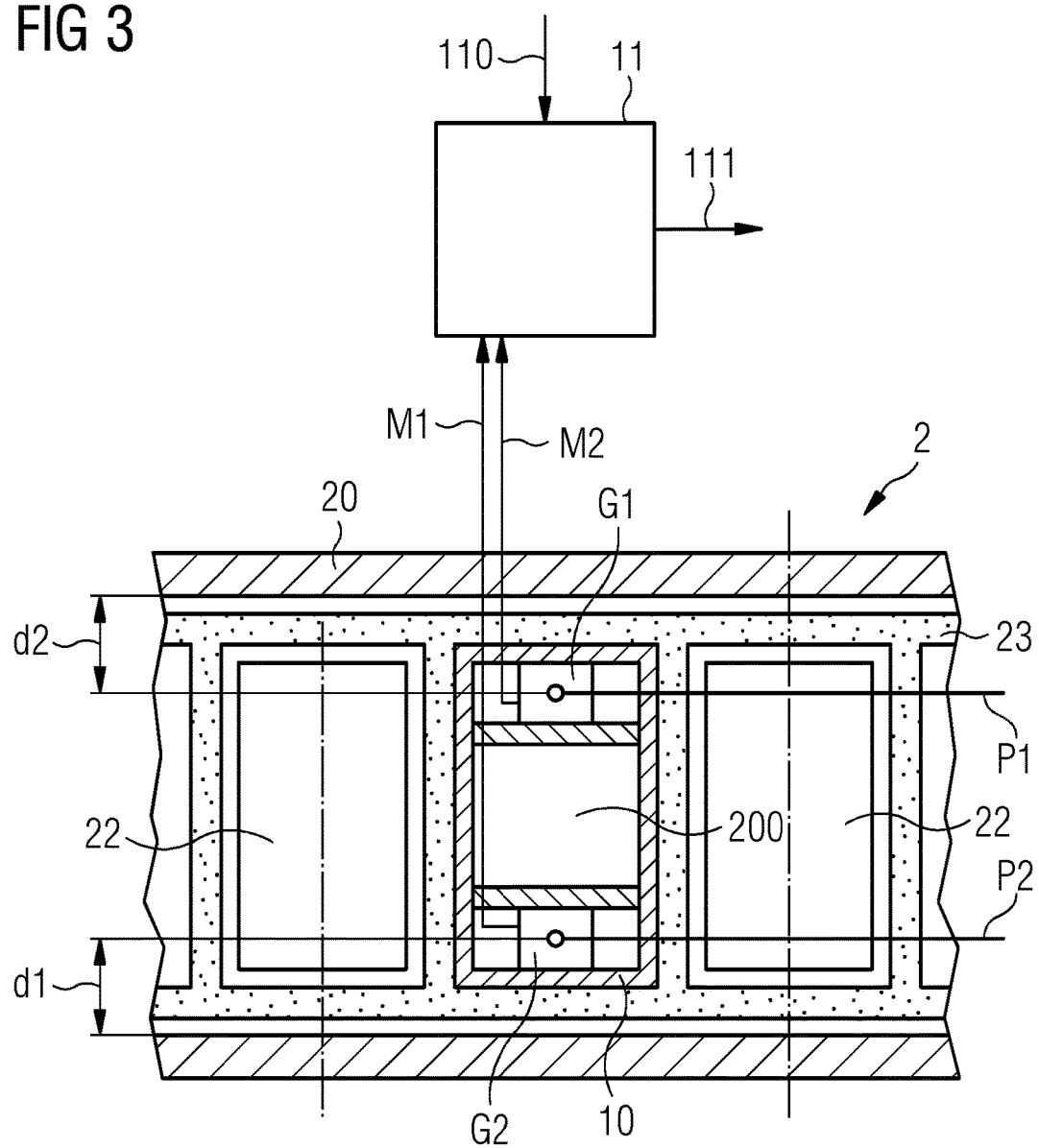
FIG. 3 shows a further partial cross-section through the bearing of FIG. 1.
Figure 4:
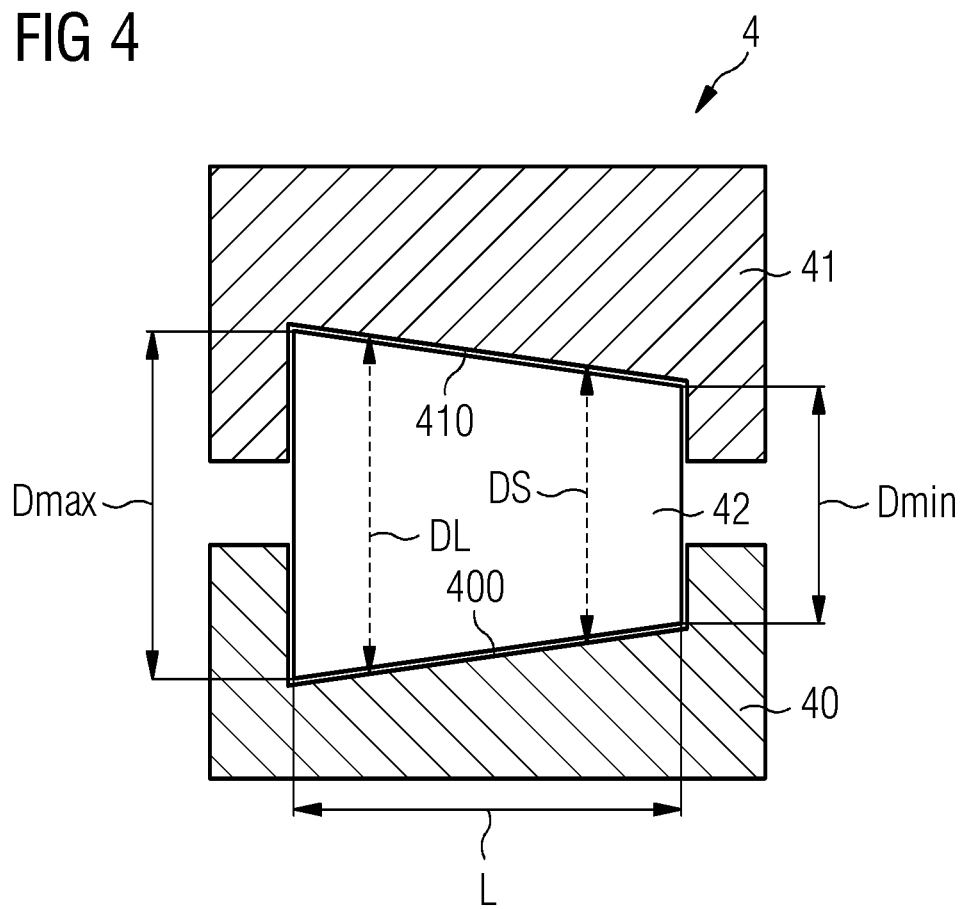
FIG. 4 shows a simplified cross-section through a tapered roller bearing.

FIG. 3 shows another view of the inventive bearing gauge arrangement 1 as part of an annular section through a bearing. The diagram shows a number of rollers 22 on either side of a holding frame 10 that replaces a roller. The rollers 22 and holding frame 10 are arranged in a cage 23. A first distance gauge G1 is arranged at a distance d1 from an inner edge of the bearing 2, and a second distance gauge G2 is arranged at a distance d2 from an outer edge of the bearing. The distance transducers G1, G2 have their effective directions into or out of the page, to monitor the distance D between inner and outer races 200, 210 as the bearing 2 rotates. Each distance gauge G, G2 effectively tracks a circular path P1, P2 that is parallel to an edge of the bearing 2. For the sake of simplicity, the embodiments of FIGS. 1-3 show a cylindrical roller bearing, but the bearing could equally well be realised as a tapered roller bearing, for which each raceway is a segment of a cone, and in which the rollers have a slightly tapered conical form. FIG. 4 shows, in simplified form, a greatly exaggerated cross-section through such a tapered roller bearing 4, showing the conical form of the inner ring 40 and outer ring 41, and also the conical form of the tapered roller 42. The bearing 4 may be regarded as having a length L over the raceways. The distance Dmax at one end of the bearing 4 is larger than the distance Dmin at the outer side of bearing 4. When used in such a bearing 4, a distance gauge of the inventive bearing gauge arrangement would track a distance (indicated by the dotted lines) between these two extremes. The distance gauge at the larger end will track a distance DL, while the distance gauge at the smaller end will track a distance DS. The difference between these will generally only be a few micrometers.

Returning to FIG. 3, measurement values M1, M2 are sent from the distance gauges G1, G2 to an evaluation module 11 during a bearing inspection procedure. To relate the measurement values M1, M2 to angular values over a full rotation of the bearing, the evaluation module 11 may be supplied with data 110 relating to the sampling rates of the distance gauges G1, G2 and the rotational velocity of the bearing 2. Alternatively, a Hall-effect sensor may be used to detect a full rotation of the bearing 2. The evaluation module 11 can provide output 111 for displaying the results of the inspection, for example as shown in the following diagrams.

The inventive bearing gauge arrangement can be used to very precisely measure a bearing before and after it has been mounted to a machine. It is important to ensure that a bearing has been machined accurately before finally installing it on a machine such as a wind turbine generator, since even only very minor flaws can lead to severe problems later on during operation of the machine. A double-row cylindrical roller bearing is usually constructed so that one of the bearing rings is a split ring, held together by a number of bolts during transport. A further set of bolts may be used to mount the bearing to the generator or other machine. It is very important to ensure that all parts are correctly and precisely aligned before the machine becomes operational.

Figure 5:
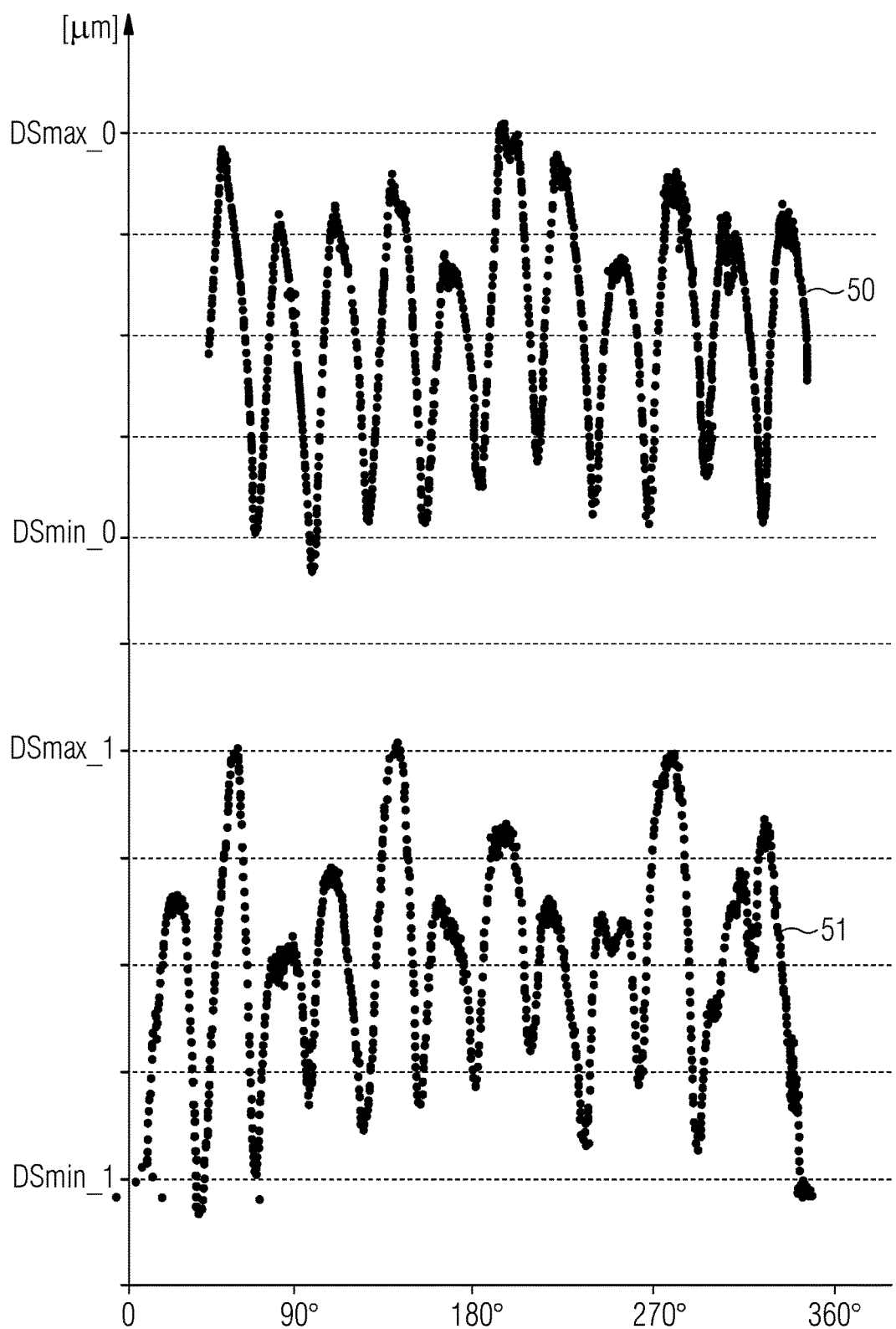
FIG. 5 shows a first evaluation result based on measurements collected by an embodiment of the bearing gauge arrangement;.
Figure 6:
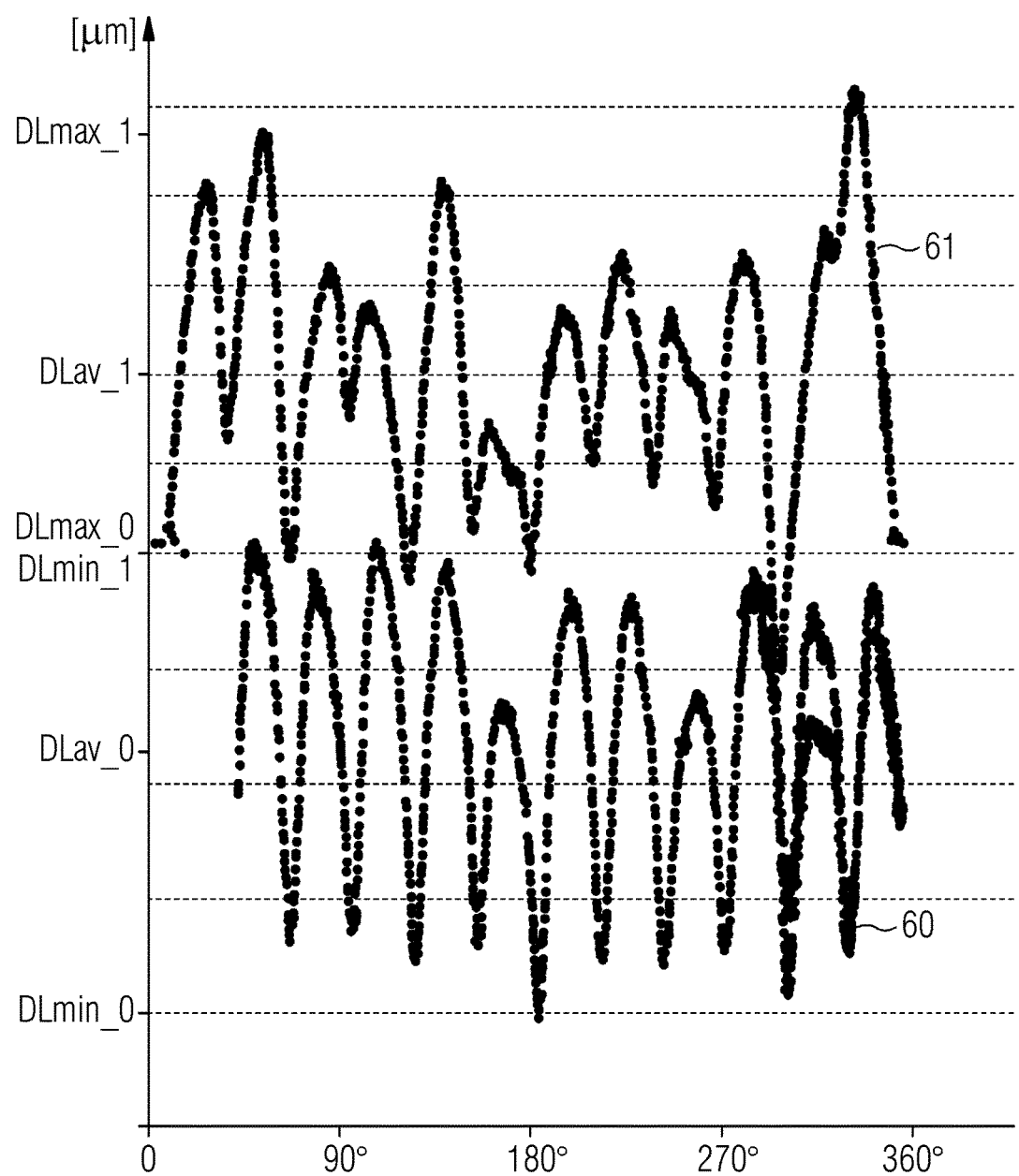
FIG. 6 shows a second evaluation result based on measurements collected by an embodiment of the bearing gauge arrangement.

FIGS. 5 and 6 show test results for the inventive bearing gauge arrangement used to monitor a double-row tapered roller bearing of the type described above, with a split or two-piece inner ring. In FIG. 5, the monitored distance DS is tracked as the bearing 4 rotates. An encoder was used to relate the measured distance values to an angular path of travel through 360°. The upper curve 50 is a plot of distance values collected by the distance gauge that monitors distance DS during operation. Ideally, this distance should be essentially constant. The test results show discrepancies relating to a number of provisional bolts used to hold together the split inner ring together before mounting to a generator. Each "peak" corresponds to the position of such a bolt. The distance DS oscillates within a lower bound DSmin_0 and an upper bound DSmax_0. In the test, the upper bound DSmax_0 was measured at 55480 µm, and the lower bound DSmin_0 was measured at about 55460 µm.

The lower curve 51 is a plot of distance values collected by the distance gauge monitoring distance DS during operation of the bearing after mounting it to the generator using a further set of bolts. The distance DS now oscillates within a lower bound DSmin_1 and an upper bound DSmax_1. In the test, the upper bound DSmax_1 was measured at 55450 µm, and the lower bound DSmin_0 was measured at about 55430 µm. These boundary values DSmin_1, DSmax_1 are each about 30 µm less than their counterparts in curve 50. After mounting the bearing to the generator and tightening the relevant bolts, the inner (smaller) diameter of the bearing 4 has effectively been decreased.

In FIG. 6, the monitored distance DL is tracked as the bearing 4 rotates through 360°. Here, the lower curve 60 is a plot of distance values collected by the distance gauge monitoring distance DL during operation of the bearing before it was mounted to the generator. The distance DL oscillates within a lower bound DLmin_0 and an upper bound DLmax_0. In the test, the upper bound was measured at about 58150 µm, and the lower bound DLmin_0 was measured at about 58130 µm. Here also, the monitored distance DL should ideally appear as a straight line.

The upper curve 61 is a plot of distance values collected by the distance gauge monitoring distance DL after the bearing was mounted to the generator. The distance DL now oscillates within a lower bound DLmin_1 and an upper bound DLmax_1. In the test, the upper bound was measured at about 58175 µm, and the lower bound DLmin_0 was measured at about 58145 µm. These boundary values DLmin_1, DLmax_1 are greater than their corresponding values in curve 60. After tightening the bolts, therefore, the outer or larger diameter of the bearing 4 has effectively been increased.

FIGS. 5-6 show that the inventive bearing gauge arrangement can very effectively identify any flaws or inaccuracies in the bearing even at a prototype stage, e.g. during tests performed on the prototype bearing for a new machine generation. Such changes—even if only in the micrometer range—are significant and can lead to uneven wear on the bearings. Any such flaws or inaccuracies in the bearing can then be remedied in good time, i.e. before going into large-scale production. This can allow considerable savings in costs that might otherwise arise from damage to the bearing and generator arising from an undetected bearing flaw.

Figure 7:
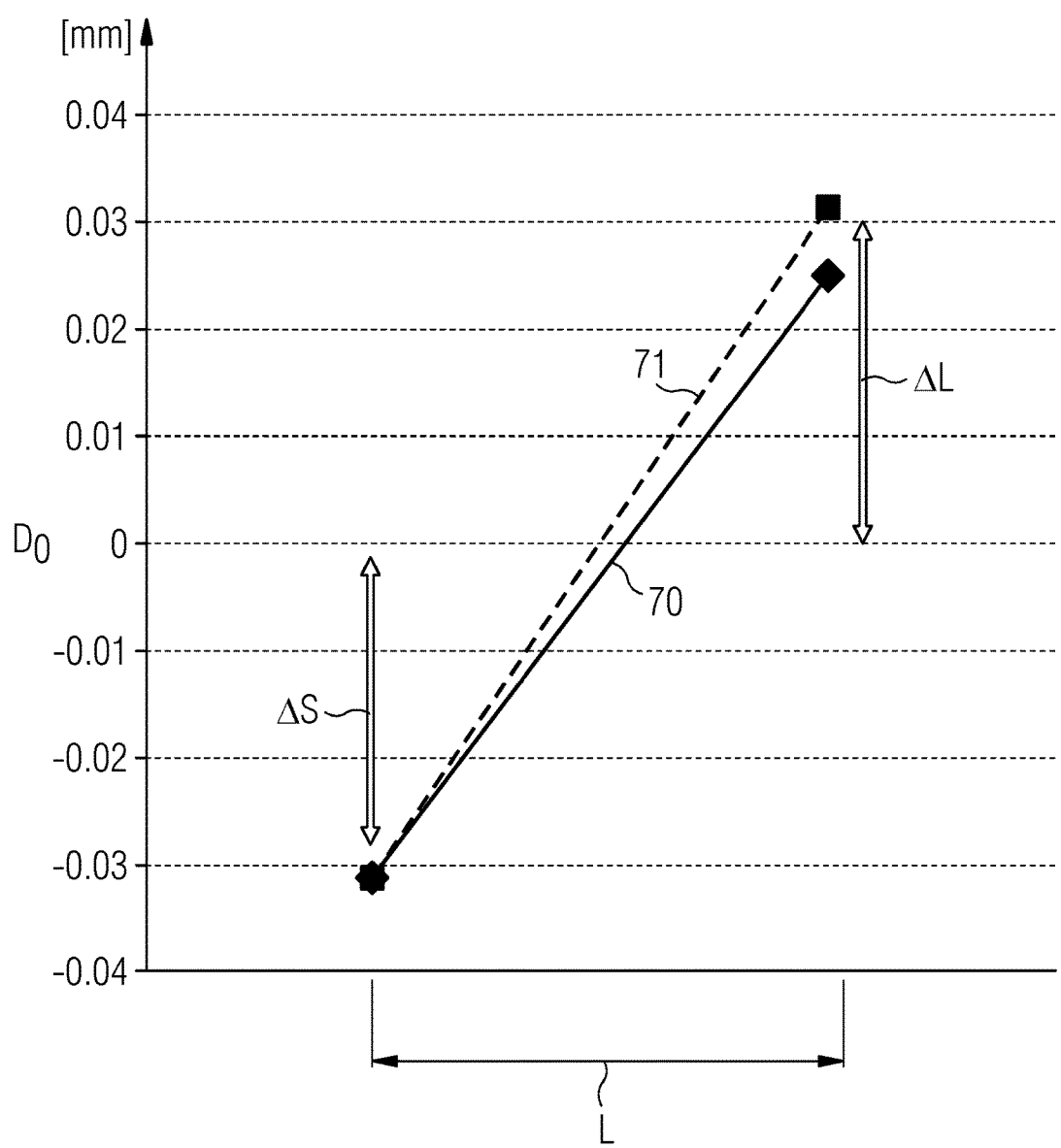
FIG. 7 shows a third evaluation result based on measurements collected by an embodiment of the bearing gauge arrangement.

FIG. 7 is another diagram showing the effect of tightening the bolts on a tapered roller bearing 4. Each graph 70, 71 indicates the departure from an ideal or specified distance $D_0$ along the length L of the bearing after tightening the bolts. Graph 70 shows a situation in which the bolts have been tightened to a torque of 3300 Nm, resulting in a compression ΔS of about 30 µm at the small end of the bearing and an opening ΔL of about 25 µm at the large end of the bearing. Graph 71 shows a situation in which the bolts have been tightened to a torque of 4500 Nm, resulting in a compression ΔS of about 30 µm at the small end of the bearing and an opening ΔL of about 30 µm at the large end of the bearing. The diagram clearly shows that the higher torque results in a significantly greater "opening" at the large end of the bearing, while the compression at the small end of the bearing is the same in each case.

Figure 8:
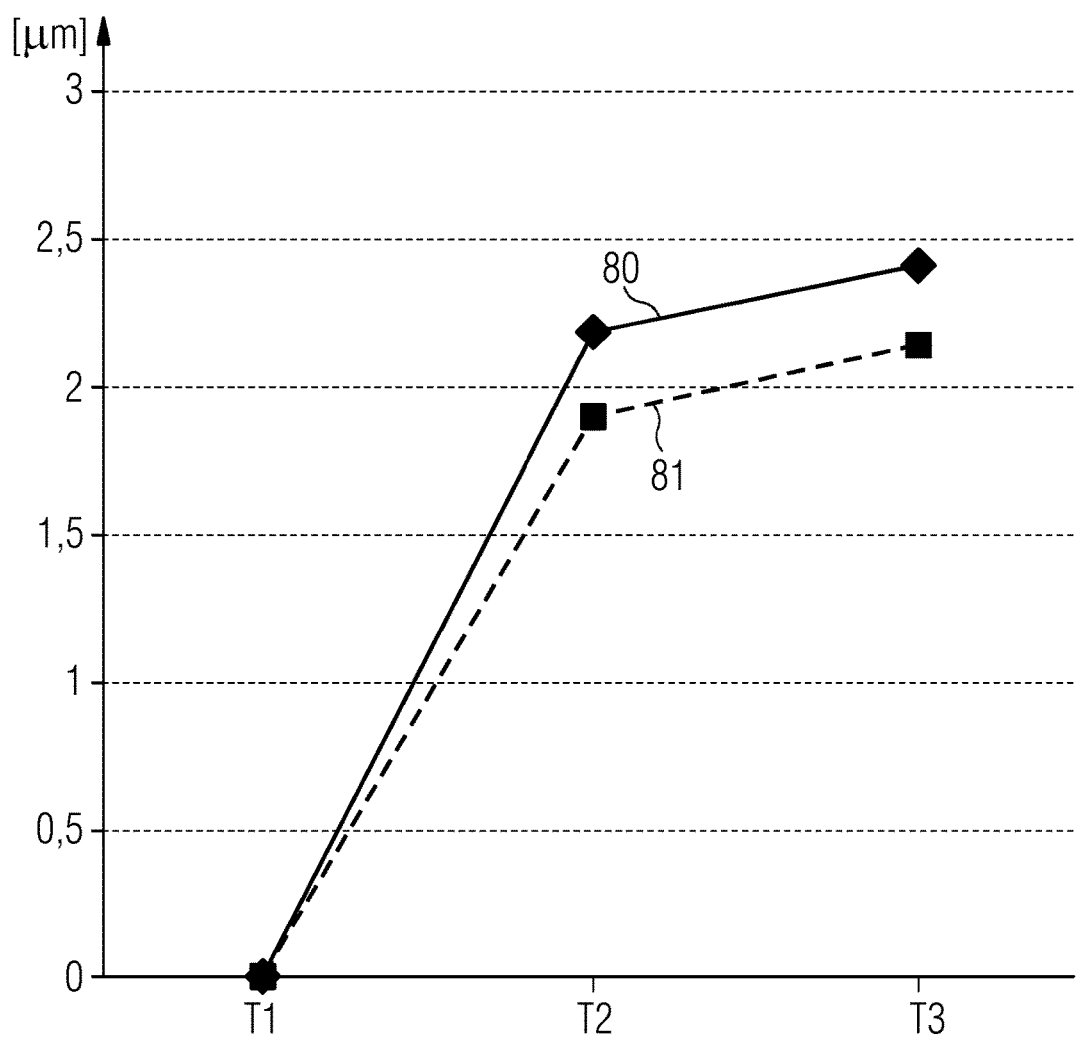
FIG. 8 shows a fourth evaluation result based on measurements collected by an embodiment of the bearing gauge arrangement.

FIG. 8 illustrates angular misalignment in a double-row roller bearing mounted to the generator of a wind turbine. The first graph 80 corresponds to measurements collected by a distance gauge at the upwind side of the bearing (e.g.

measuring the distance DL indicated in FIG. 4) at three stages T1, T2, T3. The second graph 81 corresponds to measurements collected by a distance gauge at the downwind side of the bearing (e.g. measuring the distance DS indicated in FIG. 4). The Y-axis indicates departure in micrometres [μm] from an initial measurement taken at a first stage T1, when the inner ring of the bearing is held together for transport by a first set of bolts. The initial measurement can be the average distance measured during a complete revolution of the bearing.

At a second stage T2, the bearing has been mounted to the generator, and the mounting bolts have been tightened to a first torque. The diagram shows that the distances measured by the upwind and downwind gauges now differ from the initial measurement, but to a different degree.

At a second stage T2, the bolts have been tightened to a second, higher torque. The distances measured by the upwind and downwind gauges have departed even further from the initial measurement.

FIGS. 7 and 8 show that the inventive bearing gauge arrangement can very effectively be used to identify changes in the bearing when it is mounted to its destination machine. The distances between the raceways monitored by the gauges can be used to identify problems associated with structural aspects of the bearing and can be used as a basis for remedial measures.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A bearing gauge arrangement comprising:
   a holding frame dimensioned to replace a load-carrying element between an inner race and an outer race of a bearing;
   at least one distance gauge arranged in the holding frame to measure a distance between the inner race and the outer race during operation of the bearing; and
   an evaluation unit configured to evaluate measurements from a distance gauge relative to a bearing reference dimension.

2. The bearing gauge arrangement according to claim 1, wherein a position of a distance gauge is fixed relative to the holding frame.

3. The bearing gauge arrangement according to claim 1, wherein a position of the holding frame is fixed relative to a bearing ring.

4. The bearing gauge arrangement according to claim 1, further comprising two distance gauges.

5. The bearing gauge arrangement according to claim 1, wherein a distance gauge comprises a displacement transducer.

6. The bearing gauge arrangement according to claim 1, further comprising a wireless interface between the distance gauge and the evaluation unit.

7. The bearing gauge arrangement according to claim 1, further comprising at least one spring-loaded contact against a raceway surface.

8. The bearing gauge arrangement according to claim 1, wherein the holding frame is constructed to fit within a bearing roller cage.

9. The bearing gauge arrangement according to claim 1, wherein the evaluation unit is configured to relate a distance gauge measurement to a point along the bearing circumference.

10. The bearing gauge arrangement according to claim 1, wherein the evaluation unit also receives data relating to an external bearing load, and is configured to identify a relationship between a bearing deformation and the external bearing load.

11. A wind turbine generator assembly, comprising: a bearing between a rotor and a stator, and a bearing gauge arrangement according to claim 1 arranged such that the holding frame of the bearing gauge arrangement replaces a load-carrying element of the bearing.

12. The generator assembly according to claim 11, wherein the bearing comprises a tapered roller bearing.

13. The generator assembly according to claim 11, wherein the bearing comprises a double-row roller bearing.

14. A method of detecting a deformation of a bearing, comprising:
   providing a bearing gauge arrangement with a plurality of distance gauges in a holding frame, dimensioned according to a rolling element of the bearing;
   substituting a rolling element of the bearing by the holding frame;
   applying the plurality of distance gauges to measure distance between an inner race and an outer race of the bearing during operation of the bearing; and
   evaluating the measurements relative to a bearing reference dimension.

15. The method according to claim 14, further comprising: evaluating the measurements prior to an installation procedure;
   performing the installation procedure; and
   evaluating the measurements after the installation procedure.

* * * * *